UNITED STATES PATENT OFFICE 2,395,606

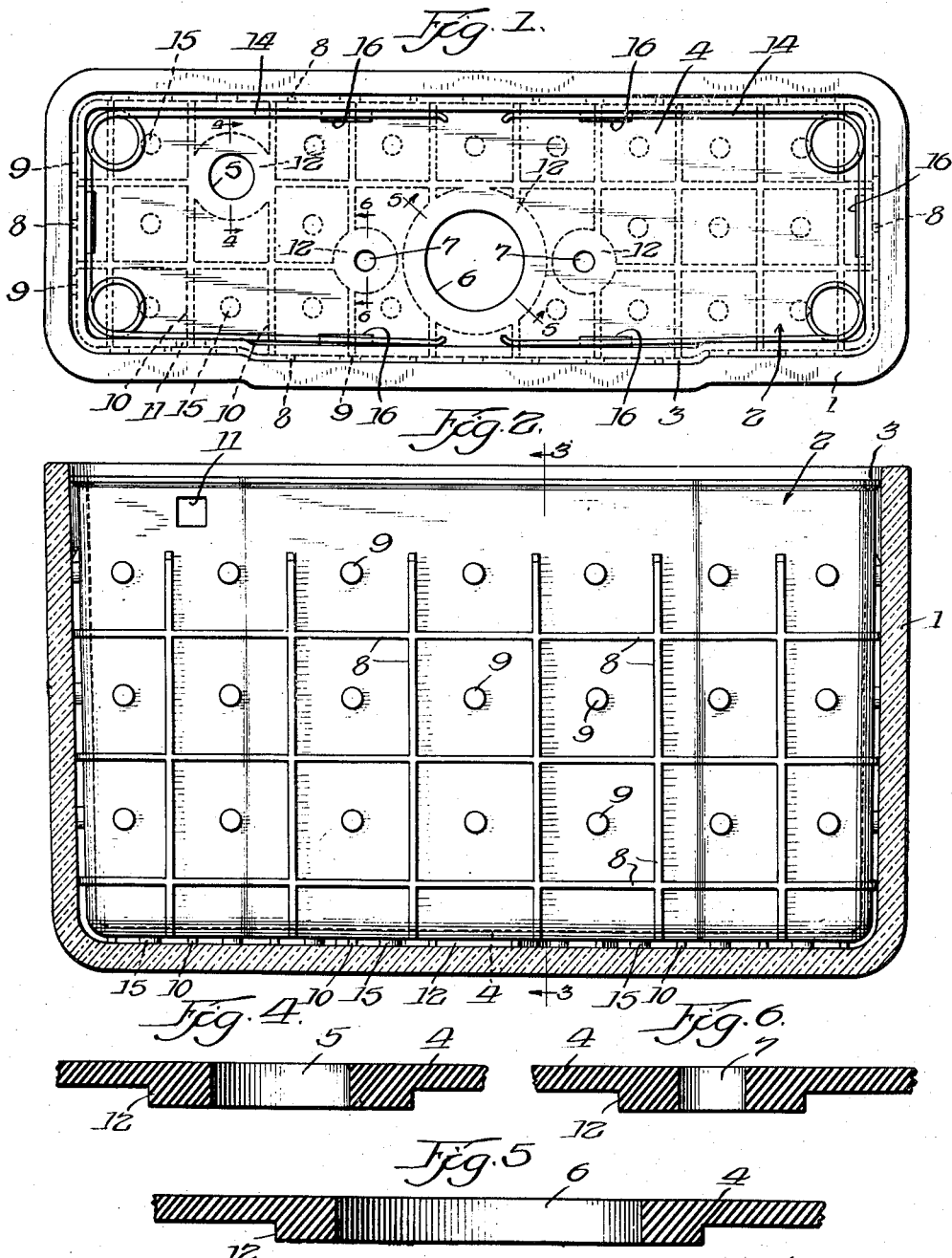

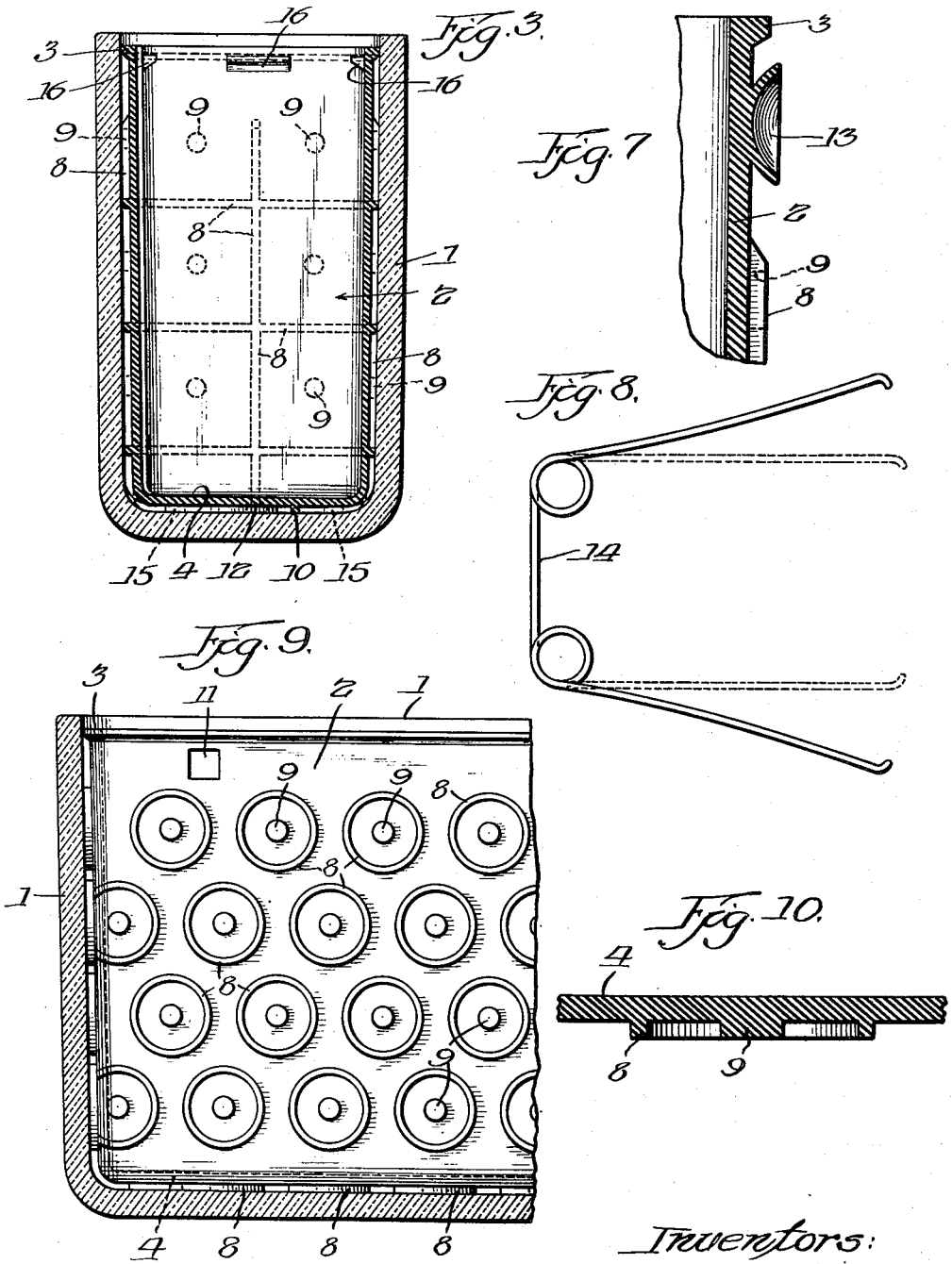

LINER FOR WATER TANKS

Roy H. Zinkil, Oak Park, and Thomas P. Newman, Geneva, Ill., assignors to Crane Co., Chicago, Ill., a corporation of Illinois Application October 15, 1942, Serial No. 462,444

1 Claim. (Cl. 4—68)

This invention relates to a novel lining of rubber or the like for hollow articles. More particularly, it is concerned with the provision of a liner for water tanks such as those useful in plumbing service and the like in which cold liquids are therein contained. Accordingly the problem of eliminating or minimizing the formation of dripping condensate accumulations on the exterior surfaces of the closet tank, for example, has been overcome.

More significantly, this invention has for its prime object the provision of a tank liner or the like which is not only capable of functioning satisfactorily in the manner above set forth, but also is sufficiently substantial so as to serve as an emergency container therewithin in the event of rupture or cracking of the tank occurring due to freezing water or for any similar inability of the outer casing to contain liquid in a leak-proof manner.

A further specific object of our invention lies in the provision of a liner in which, by means of dead air spaces or chambers between the liner and the wall of the tank, the latter member is insulated to the extent of reducing the formation of condensate exteriorly of the tank as above referred to. It has also been found that the latter dead air chambers because of inhibiting the circulation of air therewithin prevent the accumulation of moisture in the form of condensate on the outer surfaces of the liner.

Another important object is to provide a novel form of a liner made either of rubber, or of a suitable composition in which such insulating means also serve to reduce substantially such objectionable noises as those created by the entrance of supply water into the tank or similar hollow article.

A further object has for its purpose the provision of a liner for a hollow article in which a simple but effective contact means is provided at the upper peripheral surfaces of the liner and which aids thereby in maintaining non-circulating air chambers therebetween to effect an efficient insulating medium.

A still further object is to provide a novel insulating means for a tank liner in which by the method employed the liner is also stiffened and strengthened, in addition to providing effective insulation therefor.

Another object lies in providing a liner in which cooperating resilient means may be used to retain the liner in substantially tight relation against the inner upper surfaces of the tank, or, if desired, preferably integral suction cups may be employed.

Another important object resides in the provision of a hollow article insulating means of the character described in which by virtue of its submersion within the contained liquid is maintained relatively cool under all normal conditions, kept in a position remote from substantial contact with the atmosphere and in which its preservation is aided by its retention within the darkened interior of such hollow article.

Other important objects and advantages of our invention will be apparent upon proceeding with the specification read in connection with the drawings, in which Fig. 1 is a plan view of the liner installed within a conventional closet tank.

Fig. 2 is a front exterior view of the novel liner constituting our invention.

Fig. 3 is a sectional view taken on the line 3—3 of Fig. 2.

Fig. 4 is a sectional view taken on the line 4—4 of Fig. 1.

Fig. 5 is a sectional view taken on the line 5—5 of Fig. 1.

Fig. 6 is a sectional view taken on the line 6—6 of Fig. 1.

Fig. 7 is a fragmentary sectional view of a modified form showing the application of a suction cup as a means of attachment therefor.

Fig. 8 shows spring means for attaching the liner to the tank.

Fig. 9 is a front exterior view of a liner having a modified ribbing.

Fig. 10 is a fragmentary sectional view of the modified form of ribbing shown in Fig. 9.

Similar reference characters refer to similar parts.

Referring now to Fig. 1, the numeral 1 is the general designation of the peripheral limits denoting the conventional closet bowl tank or the like container in which the liner 2 of our invention has been installed for illustrative purposes. The liner 2 of our invention, as shown more clearly in Fig. 2, is preferably provided with an upper annularly extending, projecting ribbed portion 3 made integral with and extending from the vertical walls of the liner 2. The tank liner 2 is preferably made of such height as to extend at least above the highest attainable water level within the tank to thereby reduce the probability of leakage past the upper raised surface or ribbed portion 3. As indicated in Fig. 1, the interior floor or base portion 4 of the liner 2 is provided with several apertures as indicated at 5, 6 and 7 respectively, constituting the necessary inlet supply, the overflow and the discharge outlet to the plumbing fixture attached thereto such as a closet bowl or the like. For purposes of promoting greater sanitation the inner surface of the tank liner is preferably made plain and the apertures referred to are made in such suitable fitting diameters as to constitute a simple means for providing a water-tight gasket between the lower portion of the tank and the outer surface of the liner.

Now, referring to the exterior view shown in Fig. 2, the liner 2 is preferably provided with the intersecting ribbing constituting partitions generally indicated at 8 and which may assume other forms of configuration such as shown in Fig. 9. The partitioning provided by the ribbing 8 preferably extends above the plain exterior surfaces of the liner on all sides projecting thereabove, say $\frac{1}{8}$ or $\frac{1}{4}$" and including the ribbing forming similar partitions on the bottom exterior, as at 10. If the span of the ribbing 8 and 10 is relatively large, it has been found desirable to employ the supporting columns 9 and 15 therebetween, thus effectually preventing the collapse of the ribbed walls and thereby maintaining the volume of the dead air chambers between the liner and the tank uniformly even under the relatively high loads created when the liner is filled with water or other liquid. In the illustration used the closet tank liner employed is provided with the aperture 11 for projecting an actuating handle (not shown) therethrough, the handle being necessary for the operation of inner valve parts, such as a ball cock or the like. It has been found desirable in providing for the necessary gasket surface as indicated specially in the fragmentary sections of Figs. 4, 5 and 6, to make the contacting surface portion of the liner of substantially circular form, as indicated at 12, of approximately the same thickness as the ribbing 8, thus allowing for a substantial amount of integral gasket material for purposes of compression in effecting leak-proof joints at the inlet supply and discharge outlet of the tank. Thus it is evident that by employment of the ribbing 8 a minimum amount of contact surface between the liner and the tank is obtained, and at the same time the relatively resilient material of the liner permits it to conform readily to the irregularities of the tank, such as those frequently arising from variations in manufacture and due to warpage. Thus the resilient and non-absorbent properties of the liner permit it to function as a gasket for making water-tight connections between the tank and the necessary inlet and outlet or supply and discharge fittings previously referred to. It has been also discovered that apparently in view of the partition ribbing employed and the provision for the dead air chambers, the usual water noises caused by flow within the tank are substantially muffled, in addition to being effective in preventing the formation of moisture on the outer surfaces of both the liner and the tank above referred to.

Referring to the modified structure in Fig. 7, in positioning the liner within the tank the integral vacuum cups 13 may be used or else, as shown in Fig. 8, a resilient compression means such as the wire spring 14 spread to fit the end portions and corners of the liner may be used (the dotted lines showing the normal, installed position of the spring) to effect substantial contact between the liner and the tank. The positioning within the liner is facilitated by the use of the upper annular rib 3 applying a relatively high unit load. The spring member 14 is preferably supported upon the suitably positioned horizontally extending ribbing 16 to prevent the spring 14 from slipping downward to contact with water within the liner. The spring 14 is positioned directly opposite the ribbing 3 in order to apply the most effective compression load.

It will be apparent that the arrangement of ribbing may vary considerably, as for example circular or other desired configurations may be used, as shown in Fig. 9, suitably supported in the manner suggested in Fig. 1 by the similar supporting column 9.

Thus from the several modifications suggested and illustrated the application of our invention may assume numerous forms. It is desired therefore to be limited only to the extent prescribed by the appended claim.

We claim:

The combination with a flush tank having side walls and a bottom, of a resilient liner having side walls and a bottom mounted within said tank to receive a supply of water and disposed in spaced relation to the side walls and bottom of said tank, and a plurality of resilient partitions formed in the outer surface of said liner for substantially air-tight engagement with the inner surface of said tank to form a plurality of dead air chambers to prevent formation of moisture on the outer surfaces of the liner or the tank.

ROY H. ZINKIL.
THOMAS P. NEWMAN.